US010053188B2

(12) United States Patent
Staples

(10) Patent No.: US 10,053,188 B2
(45) Date of Patent: Aug. 21, 2018

(54) BICYCLE CHAIN GUIDE WITH HEIGHT ADJUSTMENT

(71) Applicant: D3 Innovation Inc., Garibaldi Highlands (CA)

(72) Inventor: Jonathan Staples, Squamish (CA)

(73) Assignee: D3 Innovation Inc., Garibaldi Highlands (CA)

(*) Notice: Subject to any disclaimer, the term of this patent is extended or adjusted under 35 U.S.C. 154(b) by 188 days.

(21) Appl. No.: 15/235,339

(22) Filed: Aug. 12, 2016

(65) Prior Publication Data

US 2017/0045121 A1 Feb. 16, 2017

Related U.S. Application Data

(60) Provisional application No. 62/204,764, filed on Aug. 13, 2015.

(51) Int. Cl.
*F16H 7/18* (2006.01)
*B62J 13/00* (2006.01)
*F16D 1/00* (2006.01)
*F16H 57/02* (2012.01)
*B62M 9/10* (2006.01)
*B62M 9/121* (2010.01)
*B62M 9/00* (2006.01)

(52) U.S. Cl.
CPC ............ *B62M 9/105* (2013.01); *B62M 9/121* (2013.01); *B62M 2009/007* (2013.01); *F16H 2007/185* (2013.01)

(58) Field of Classification Search
CPC . B62J 13/00; B62J 23/00; B62M 9/16; B62M 9/136

USPC .................................................... 474/140, 144
See application file for complete search history.

(56) References Cited

U.S. PATENT DOCUMENTS 1,400,131 A * 12/1921 Adams ..................... B62J 13/02
474/144
1,636,327 A * 7/1927 Roe .......................... B62J 13/00
474/144

(Continued)

OTHER PUBLICATIONS

<http://ridegravity.com/portfolio-item/grid-iscg-chainguide/>, Apr. 20, 2015.

(Continued)

*Primary Examiner* — Henry Y Liu
(74) *Attorney, Agent, or Firm* — Gilbert's LLP; Kevin Shipley

(57) ABSTRACT

A chain guide for a bicycle having may include a base frame and a height adjustment member connected to the base frame and slidable relative to the base frame and lockable in a first position by engaging a first locking member. A retaining member may be pivotally connected to the height adjustment member and may be pivotable about a pivot axis a retaining position, in which the retaining member is positioned to obstruct lateral movement of the chain away from the chainring thereby preventing lateral misalignment between the chain and the chainring, and a removal position, in which the retaining member does not obstruct lateral movement of the chain away from the base frame while the height adjustment member is locked in the first position. The pivot axis may be spaced apart from the first locking member.

20 Claims, 6 Drawing Sheets

(56) References Cited

U.S. PATENT DOCUMENTS

| | | | | |
|---|---|---|---|---|
| 4,471,851 A * | 9/1984 | Kamiya | ............... | B62J 13/00 180/219 |
| 4,662,862 A * | 5/1987 | Matson | ............... | F16H 7/08 474/101 |
| 4,786,071 A * | 11/1988 | Nagano | ............... | B62J 13/00 280/304.3 |
| 4,832,667 A * | 5/1989 | Wren | ............... | B62M 9/135 474/140 |
| 4,960,402 A * | 10/1990 | Klein | ............... | B62J 13/00 474/101 |
| 5,002,520 A * | 3/1991 | Greenlaw | ............... | B62J 13/00 474/140 |
| 5,067,930 A * | 11/1991 | Morales | ............... | B62J 13/00 280/304.3 |
| 5,460,576 A * | 10/1995 | Barnett | ............... | B62J 13/00 474/140 |
| 5,496,222 A * | 3/1996 | Kojima | ............... | B62M 9/1342 474/80 |
| 5,679,084 A * | 10/1997 | Daniels, III | ............... | B62M 9/16 474/140 |
| 5,725,450 A * | 3/1998 | Huskey | ............... | B62M 9/06 474/116 |
| 5,782,714 A * | 7/1998 | Osgood | ............... | B62J 13/00 474/144 |
| 6,354,973 B1 * | 3/2002 | Barnett | ............... | B62J 13/00 474/101 |
| 6,533,690 B2 * | 3/2003 | Barnett | ............... | B62J 13/00 474/116 |
| 8,235,849 B2 * | 8/2012 | Cranston | ............... | B62J 13/00 280/261 |
| 8,491,429 B2 * | 7/2013 | Cranston | ............... | B62J 13/00 280/304.3 |
| 8,961,342 B2 * | 2/2015 | Emura | ............... | B62M 9/136 474/140 |
| 8,965,610 B2 * | 2/2015 | Boyle | ............... | B62M 6/50 180/206.1 |
| 8,968,129 B2 * | 3/2015 | Emura | ............... | B62M 9/16 474/111 |
| 8,979,685 B2 * | 3/2015 | Weagle | ............... | B62J 23/00 474/144 |
| 9,249,867 B2 * | 2/2016 | Graziosi | ............... | B62M 9/16 |
| 9,327,786 B2 * | 5/2016 | Cranston | ............... | F16H 7/20 |
| 9,446,817 B2 * | 9/2016 | Santurbane | ............... | B62M 9/136 |
| 9,896,157 B2 * | 2/2018 | Emura | ............... | B62M 9/135 |

OTHER PUBLICATIONS

<http://www.bikerumor.com/2010/03/03/nahbs-paul-components-new-bb-chainguide-and-medium-reach-center-pull-brakes/>, Mar. 3, 2010.
<https://paulcomp.com/shop/components/chain-keeper-bb/>, accessed Oct. 7, 2016.
<https://bythehive.com/pages/chainguides>, accessed Oct. 7, 2016.

* cited by examiner

BICYCLE CHAIN GUIDE WITH HEIGHT ADJUSTMENT

CROSS-REFERENCE TO RELATED APPLICATIONS

This application claims the benefit of 35 USC 119 based on the priority of U.S. Provisional Patent Application 62/204,764, filed Aug. 13, 2015 and entitled Bicycle Chain Device with Height Adjustment, the entirety of which is incorporated herein by reference.

TECHNICAL FIELD

The present invention relates to a bicycle chain guide, and in particular, to a bicycle chain guide for use with a bicycle drivetrain having a chainring mounted to a front crankset.

INTRODUCTION

U.S. Pat. No. 6,533,690 discloses a bicycle includes a conventional pedal crank and chain drive together with a conventional derailleur shifting mechanism operative to selectively transfer the drive chain between alternative rear sprockets of the bicycle drive system. A chain ring is rotatable in response to pedal crank rotation to transfer pedal crank power to the rear sprockets. A pair of guide blocks define respective internal guide channels through which the drive chain passes toward and from engagement with the chain ring. The guide blocks are maintained at their respective positions by a guide support plate secured to the bicycle frame.

U.S. Pat. No. 8,235,849 discloses a combined chain guide and chain ring protector for a bicycle for off-road use having a lower bracket sleeve, a chain ring around which a drive chain extends and a chain ring outer radius. The protector includes a mounting bracket secured at the lower bracket sleeve and a guard mounted thereto. An outer edge of the guard extends beyond the outer radius of the chain ring, thereby protecting a portion of the chain ring from inadvertent impacts. The chain guide extends from the mounting bracket along a path of the drive chain, and preferably includes an upper guide having an inner barrier positioned inboard of the bicycle chain an outer barrier positioned outboard of the inner barrier and an upper barrier positioned above the bicycle chain for preventing the chain from derailing from the chain ring in an upward direction.

SUMMARY

A chain guide for a bicycle can be configured so that its retaining member can be operated (i.e. moved from a chain retaining position to a chain removal position and/or detached) independently of adjusting the height of the retaining member relative to the chainring. For example, the chain guide may include a base frame that can be connected to the frame of a bicycle, preferably adjacent the front chainring (but alternatively in other locations). The base frame can be attached to the frame using any suitable fasteners, including bolts. The retaining member can be movably mounted on the base frame so that its height can be varied based on a particular chainring and/or chain that is being used by a rider. This may be helpful if the chain guide is provided as an aftermarket part that can be used with a variety of bikes and crank sets, and/or if a user changes chain rings on their bicycle. Once the retaining member has been positioned at a desired height relative to a given chain ring, it may be advantageous in some instances to allow the retaining member to be operated without having to re-set and/or re-adjust its height setting. For example, a rider may wish to move the retaining member into a removal position which can allow the chain to be removed, for example for cleaning or inspection, and then return the retaining member to a retaining position, in which it acts to prevent disengagement of the chain from the chain ring.

Optionally, to help facilitate independent height positioning and operation of the retaining member, the chain guide may include a height adjustment member that extends between the base frame and the retaining member. The height adjustment member may be movable relative to the frame to adjust the height of the retaining member, and may be locked in a desired position using a first locking member. The first locking member may optionally include the fastener that is used to attach the height adjustment member to the base frame, or may include a separate locking device. Then the first locking member is engaged, the height adjustment member may be fixed relative to the base frame. The retaining member may be movably coupled to the height adjust member, and may be movable between its retaining and removal positions while the height adjustment member remains locked in place (i.e. while the first locking member is engaged). Because the first locking member need not be disengaged to allow operation of the retaining member, the height position of the retaining member may set.

Preferably, the retaining member is pivotable relative to the height adjustment member to move between its retaining and removal positions, and is pivotable about a pivot axis that is spaced apart from the first locking member. This may allow the retaining member to be pivoted without unlocking the height adjustment member. This may also allow the first locking member to be positioned in a relatively inaccessible, inconvenient location (as it is accessed less frequently) while the pivot axis is located in a desired location, for example proximate the periphery of the chainring and accessible to the user.

Optionally, the retaining member may be connected to the height adjustment member using a pivotable mounting fastener, whereby the mounting fastener is co-axial with the pivot axis, and is spaced apart from the first locking member. Preferably, the fastener used to mount the retaining member to the height adjustment member is separate from the fastener used to mount the height adjustment member to the base frame. This may help facilitate independent operation/movement of the components, and may allow the retaining member to be detached (for example by removing its fastener) without requiring the detachment of the height adjustment member or the loosening of its fastener (i.e. without disturbing the height setting).

Optionally, the retaining member may be lockable in the retaining position, the removal position, or both using a second locking member. The second locking member may include the mounting fastener that is used to attach the retaining member to the height adjustment member. For example, the fastener may be a threaded type fastener that can be tightened to prevent movement of the retaining member relative to the height adjustment member, and loosened to allow relative movement. Alternatively, the second locking member may be separate from the mounting fastener. This may allow the second locking member to have various configurations and may allow the locking member to be positioned at a different location than the pivot joint. For example, the second locking member may include a pin that engages the retaining member at a location that is spaced from the mounting fastener, or the co-operation between a detent and a complimentary receiving portion provided on the retaining member and height adjustment member. Optionally, the second locking member may be engageable and disengagable by hand, i.e. without the need for tools to loosen a threaded fastener or the like, which may allow a user to more easily manipulate the retaining member while on the trail or otherwise without tools.

One embodiment of a bicycle chain guide may have a height adjustment mechanism that is independent of the mounting mechanisms for both its chain retaining member and bicycle frame mounting portion.

One embodiment of a bicycle chain guide may have a chain retaining member mounted such that it can be removed or rotated without affecting the chain retaining member height once reinstalled.

One embodiment of a bicycle chain guide for use with a bicycle drivetrain having one chainring on the front crankset may have a chain retaining member mounted such that it can be removed or rotated to allow installation, removal or performance of maintenance to the chain, chainring or crankset without having to reset the height of the chain retaining member of the chain device.

In accordance with one broad aspect of the teachings described herein, a chain guide for a bicycle having a chainring and a chain can include a base frame having a mounting portion for connecting to a bicycle. A height adjustment member may be connected to the base frame and may be slidable relative to the base frame so that the height adjustment member is movable relative to the base frame and can be selectably locked in a first position by engaging a first locking member. A retaining member may be pivotally connected to the height adjustment member and may be pivotable about a pivot axis while the height adjustment member is locked in the first position. The pivot axis may be spaced apart from the first locking member. When the base frame is connected to the bicycle with the height adjustment member locked in the first position and the retaining member positioned proximate a periphery of the chainring the retaining member may be pivotable between a retaining position, in which the retaining member is positioned to obstruct lateral movement of the chain away from the chainring thereby preventing lateral misalignment between the chain and the chainring, and a removal position, in which the retaining member does not obstruct lateral movement of the chain away from the base frame.

The retaining member may have a first end and a second end that comprises the pivot axis and is spaced from the first end in a direction that is parallel a direction of travel of the chain relative to the retaining member.

The retaining member may include a bottom face that is downward facing when the base frame is connected to the bicycle and the retaining member is in the retaining position, and an end face at the second end. A distance between the pivot axis and the bottom face in a first direction may be greater than a distance between the pivot axis and the end face in a second direction that is orthogonal to the first direction.

The retaining member may be selectably locked in the retaining position by engaging and disengaging a second locking member that is spaced apart from the first locking member. The second locking member may include a fastener that extends through the retaining member, and may be engaged and disengaged independent of whether the first locking member is engaged or disengaged.

The fastener may be co-axial with the pivot axis whereby the retaining member pivots about second locking member.

When the base frame is connected to the bicycle, the height adjustment member is in the first position and the retaining member is positioned proximate the periphery of the chainring, the retaining member may be laterally translated away from the base frame in the direction of the pivot axis while in the removal position and may be obstructed from translating away from the base frame by the chainring when in the retaining position.

When the base frame is connected to the bicycle with the height adjustment member locked in the first position and the retaining member is positioned proximate a periphery of the chainring and in the removal position the retaining member is translatable laterally away from the height adjustment member while the height adjustment member is locked in the first position to detach the retaining member from the height adjustment member.

The retaining member may include a first chain retaining face and an opposing second chain retaining face that is laterally spaced apart from and faces the first retaining surface, whereby when the base frame is connected to the bicycle the chain is disposed laterally between the first and second chain retaining faces, and wherein the retaining member pivots in a first direction about the pivot axis from the retaining position to the removal position substantially the entire first and second chain retaining surfaces move in the first direction away from the chain.

The retaining member may include a first chain retaining face and an opposing second chain retaining face that is laterally spaced apart from and faces the first chain retaining surface, whereby when the base frame is connected to the bicycle and the retaining member is in the retaining position the chain is disposed laterally between the first and second chain retaining faces and a clearance plane defining an upper surface of the chain intersects the first and second chain retaining faces, and when the retaining member is in the removal position it is disposed entirely above the clearance plane.

The height adjustment member may include a sliding surface and the base frame includes a complimentary abutment surface such that engagement between the sliding surface and abutment surface prevents rotation of the height adjustment member relative to the base frame while permitting only linear translation therebetween.

The base frame may be securable to the bicycle using at least one base fastener that is spaced apart from the first locking member. The first locking member may be engaged and disengaged independent of the at least one base fastener.

When the base frame is connected to the bicycle the retaining member may form the upper most part of the chain guide when the height adjustment member is in the first position and when the height adjustment member is moved to a different, second position relative to the base frame.

In accordance with another aspect of the teachings described herein, a chain guide for a bicycle having a chainring and a chain may include a base frame having a mounting portion for connecting to a bicycle. A height adjustment member may be connected to the base frame and may be slidable relative to the base frame whereby the height adjustment member is movable relative to the base frame and can be selectably locked in a first position by engaging a first locking member. A retaining member may be pivotally mounted to the height adjustment member by a mounting fastener that defines a pivot axis and extends through the retaining member. The mounting fastener may be being spaced apart from the first locking member. The retaining member may be pivotable about the pivot axis while the first locking member is engaged between a retaining position, in which the retaining member is positioned to obstruct lateral movement of the chain away from the chainring when the base frame is connected to the bicycle thereby preventing lateral misalignment between the chain and the chain ring, and a removal position, in which the retaining member does not obstruct lateral movement of the chain away from the base frame.

The first locking member may include a first fastener securing the height adjustment member to the base frame, wherein the first locking member is disengaged by loosening the first fastener and engaged by tightening the first fastener. A second locking member may be spaced apart from the first locking member and may be used for locking the retaining member to the height adjustment member such that the retaining member is movable relative to the height adjustment member when the second locking member is disengaged and is not movable relative to the height adjustment member when the second locking member is engaged. The second locking member may disengagable independently of the first locking member.

The second locking member may include the mounting fastener, and may be disengaged by loosening the mounting fastener and be engaged by tightening the mounting fastener.

The second locking member may be spaced apart from the mounting fastener.

The second locking member may include a detent provided on one of the retaining member and the height adjustment member that engages with a complimentary receiving portion on the other one of the retaining member and the height adjustment member. The second locking member may be disengaged by disengaging the detent from the receiving portion.

In accordance with another broad aspect of the teachings described herein, a chain guide for a bicycle having a chainring and a chain may include a base frame having a mounting portion for connecting to a bicycle. A height adjustment member may be connected to the base frame and may be slidable relative to the base frame whereby the height adjustment member is movable relative to the base frame and can be selectably locked in a first position by engaging a first locking member. A retaining member may be pivotally mounted to the height adjustment member by a mounting fastener that defines a pivot axis and extends through the retaining member to engage the height adjustment member. When the base frame is connected to the bicycle with the height adjustment member locked in the first position and the retaining member is positioned proximate a periphery of the chainring the retaining member may be pivotable about the pivot axis between a retaining position, in which the retaining member is positioned to obstruct lateral movement of the chain away from the chainring when the base frame is connected to the bicycle thereby preventing lateral misalignment between the chain and the chain ring, and a removal position, in which the retaining member does not obstruct lateral movement of the chain away from the base frame. Also, while the retaining member is in the removal position the mounting fastener may be removable whereby the retaining member may be translatable laterally away from the height adjustment member to detach the retaining member from the height adjustment member.

The retaining member may be lockable in the retaining position by engaging a second locking member that is spaced apart from and operable independently from the first locking member.

The second locking member may include the mounting fastener, and the second locking member is disengaged by loosening the mounting fastener and engaged by tightening the mounting fastener.

In accordance with another broad aspect of the teachings described herein, a chain guide for a bicycle having a chainring and a chain may include a base frame having a mounting portion for connecting to a bicycle. A height adjustment member may be connected to the base frame and may be slidable relative to the base frame whereby the height adjustment member is movable relative to the base frame and is lockable in a first position by engaging a first locking member. A retaining member may be pivotally connected to the height adjustment member and may be pivotable about a pivot axis that is spaced apart from the first locking member while the height adjustment member is locked in the first position. The retaining member may be lockable in a retaining position by engaging a second locking member that extends through at least a portion of the retaining member. The second locking member may be spaced apart from the first locking member and can be engaged and disengaged independent of whether the first locking member is engaged or disengaged. When the base frame is connected to the bicycle with the height adjustment member locked in the first position and the retaining member positioned proximate a periphery of the chainring the retaining member is pivotable between the retaining position, in which the retaining member is positioned to obstruct lateral movement of the chain away from the chainring thereby preventing lateral misalignment between the chain and the chainring, and a removal position, in which the retaining member does not obstruct lateral movement of the chain away from the base frame.

The retaining member may have a first end and a second end that comprises the pivot axis and is spaced from the first end in a direction that is parallel a direction of travel of the chain relative to the retaining member.

The first end may be spaced apart from the height adjustment member and the second end may be adjacent and overlie the height adjustment member.

The retaining member may include a bottom face that is downward facing when the base frame is connected to the bicycle and the retaining member is in the retaining position, and an end face at the second end. A distance between the pivot axis and the bottom face in a first direction may be greater than a distance between the pivot axis and the end face in a second direction that is orthogonal to the first direction.

The retaining member may be connected to the height adjustment member by a mounting fastener that extends through the retaining member and is co-axial with the pivot axis whereby the retaining member pivots about the mounting fastener.

The second locking member may include the mounting fastener and may be disengaged by loosening the mounting fastener and engaged by tightening the mounting fastener and the retaining member pivots about second locking member.

The second locking member may include a threaded fastener and the second locking member may be disengaged by loosening the threaded fastener and engaged by tightening the threaded fastener.

The threaded fastener may extend through the retaining member and threadingly engage the height adjustment member.

The first locking member may include a first threaded fastener and is disengaged by loosening the first threaded fastener and engaged by tightening the first threaded fastener. The second locking member may include a second threaded fastener that is parallel to and offset from the first threaded fastener. The second locking member may be disengaged by loosening the second threaded fastener and engaged by tightening the second threaded fastener.

When the base frame is connected to the bicycle, the height adjustment member is in the first position and the retaining member is positioned proximate the periphery of the chainring, the retaining member may be laterally translated away from the base frame in the direction of the pivot axis while in the removal position and may be obstructed from translating away from the base frame by the chainring when in the retaining position.

When the base frame is connected to the bicycle with the height adjustment member locked in the first position and the retaining member is positioned proximate a periphery of the chainring and in the removal position the retaining member may be translatable laterally away from the height adjustment member while the height adjustment member is locked in the first position to detach the retaining member from the height adjustment member.

The retaining member may include a first chain retaining face and an opposing second chain retaining face that is laterally spaced apart from and faces the first chain retaining surface. When base frame is connected to the bicycle the chain may be disposed laterally between the first and second chain retaining faces. When retaining member pivots in a first direction about the pivot axis from the retaining position to the removal position substantially the entire first and second chain retaining surfaces move in the first direction away from the chain.

The retaining member may include a first chain retaining face and an opposing second chain retaining face that is laterally spaced apart from and faces the first retaining surface. When the base frame is connected to the bicycle and the retaining member is in the retaining position the chain is disposed laterally between the first and second chain retaining faces and a clearance plane defining an upper surface of the chain may intersect the first and second chain retaining faces. When the retaining member is in the removal position it may be disposed entirely above the clearance plane.

The height adjustment member may include a sliding surface and the base frame may include a complimentary abutment surface such that engagement between the sliding surface and abutment surface prevents rotation of the height adjustment member relative to the base frame while permitting only linear translation therebetween.

The base frame may be securable to the bicycle using at least one base fastener that is spaced apart from the first locking member, and wherein the first locking member can be engaged and disengaged independent of the at least one base fastener.

When the base frame is connected to the bicycle the retaining member may form the upper most part of the chain guide when the height adjustment member is in the first position and when the height adjustment member is moved to a different, second position relative to the base frame.

In accordance with another broad aspect of the teachings described herein, a chain guide for a bicycle having a chainring and a chain may include a base frame having a mounting portion for connecting to a bicycle. A height adjustment member may be connected to the base frame and slidable relative to the base frame whereby the height adjustment member is movable relative to the base frame and is lockable in a first position by engaging a first locking member. A retaining member may be pivotally connected to the height adjustment member and may be spaced apart from the first locking member. The retaining member may be pivotable about a pivot axis while the height adjustment member is locked in the first position and ay include a first chain retaining face and an opposing second chain retaining face that is laterally spaced apart from and faces the first retaining surface a first chain retaining face. When the base frame is connected to the bicycle with the height adjustment member locked in the first position and the retaining member positioned proximate a periphery of the chainring the retaining member may be pivotable between a retaining position, in which the chain is disposed laterally between the first and second chain retaining faces whereby engagement between the chain and the first and second chain retaining faces obstructs lateral movement of the chain away from the chainring, and a removal position, in which the first and second chain retaining faces are spaced above the chain and the retaining member does not obstruct lateral movement of the chain away from the base frame. The retaining member may be lockable in the retaining position by engaging a second locking member that extends through at least a portion of the retaining member, and wherein the second locking member is spaced apart from the first locking member and can be engaged and disengaged independent of whether the first locking member is engaged or disengaged.

The retaining member may be connected to the height adjustment ember by a mounting fastener that extends through the retaining member and engages the height adjustment member and is co-axial with the pivot axis whereby the retaining member pivots about the mounting fastener, and wherein the mounting fastener is spaced apart from the first and second chain retaining faces.

The first locking member may include a first threaded fastener which extends through a slot in the base frame and is disengaged by loosening the first threaded fastener and engaged by tightening the first threaded fastener, and the second locking member may include a second threaded fastener that is parallel to and offset from the first threaded fastener. The second locking member may be disengaged by loosening the second threaded fastener and engaged by tightening the second threaded fastener.

When the retaining member is in the retaining position a clearance plane defined by an upper surface of the chain may intersect the first and second chain retaining faces. The retaining member may be pivotable without disengaging the first locking member into the removal position in which the entirety of the retaining member is disposed entirely above the clearance plane.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
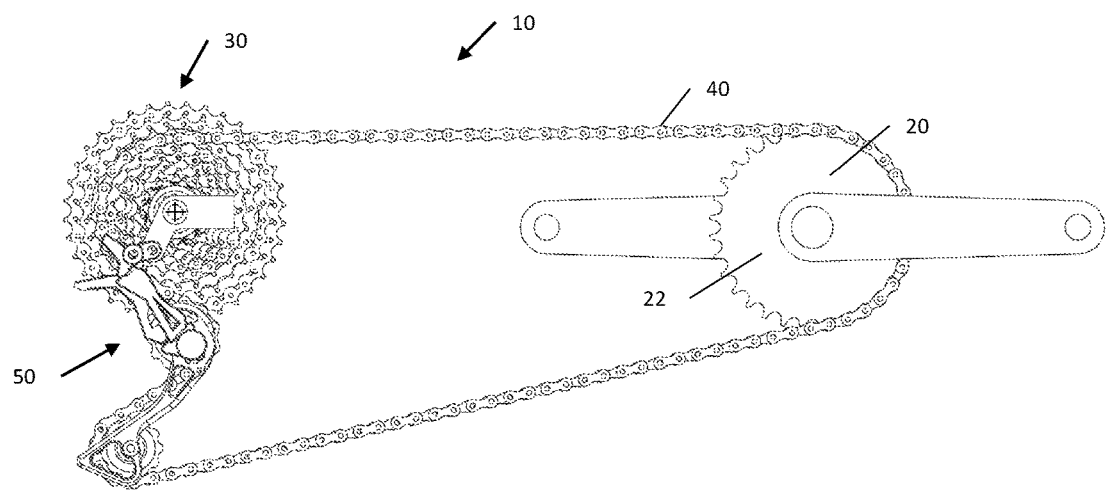
FIG. 1 is a side plan view of a bicycle drivetrain.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

A conventional bicycle drivetrain 10 may include a front crankset 20 and a multi-gear rear cassette 30, a rear derailleur 50 and a chain 40 that connects the front crankset 10 and the multi-gear rear cassette 30. The multi-gear rear cassette 30 is, in this example, comprised of multiple chainrings of different diameters which offer a bicyclist a multitude of speed options. The multi-gear rear cassette 30 can be rotatably connected to a rear wheel of the bicycle (not shown). The front crankset 20 is connected to the bicycle frame (not shown in FIG. 1) and comprises a rotatably attached chainring 22. The bicyclist rotates the crankset by pedaling which moves the chain around the multi-gear rear cassette, propelling the bicycle.

Bicycle drivetrains may include multiple chainrings 22 mounted to the front crankset to provide the rider with more speed options. However, some bicycles have only one chainring 22 at the front crankset 20, as illustrated in FIG. 1. The single chainring 22 for a bicycle drivetrain with only one chainring mounted to the front crankset may be any suitable chainring, and may have a diameter from tooth counts of 26T to 38T depending on the strength of the rider and the terrain the bicycle will be operated on.

Figure 10:
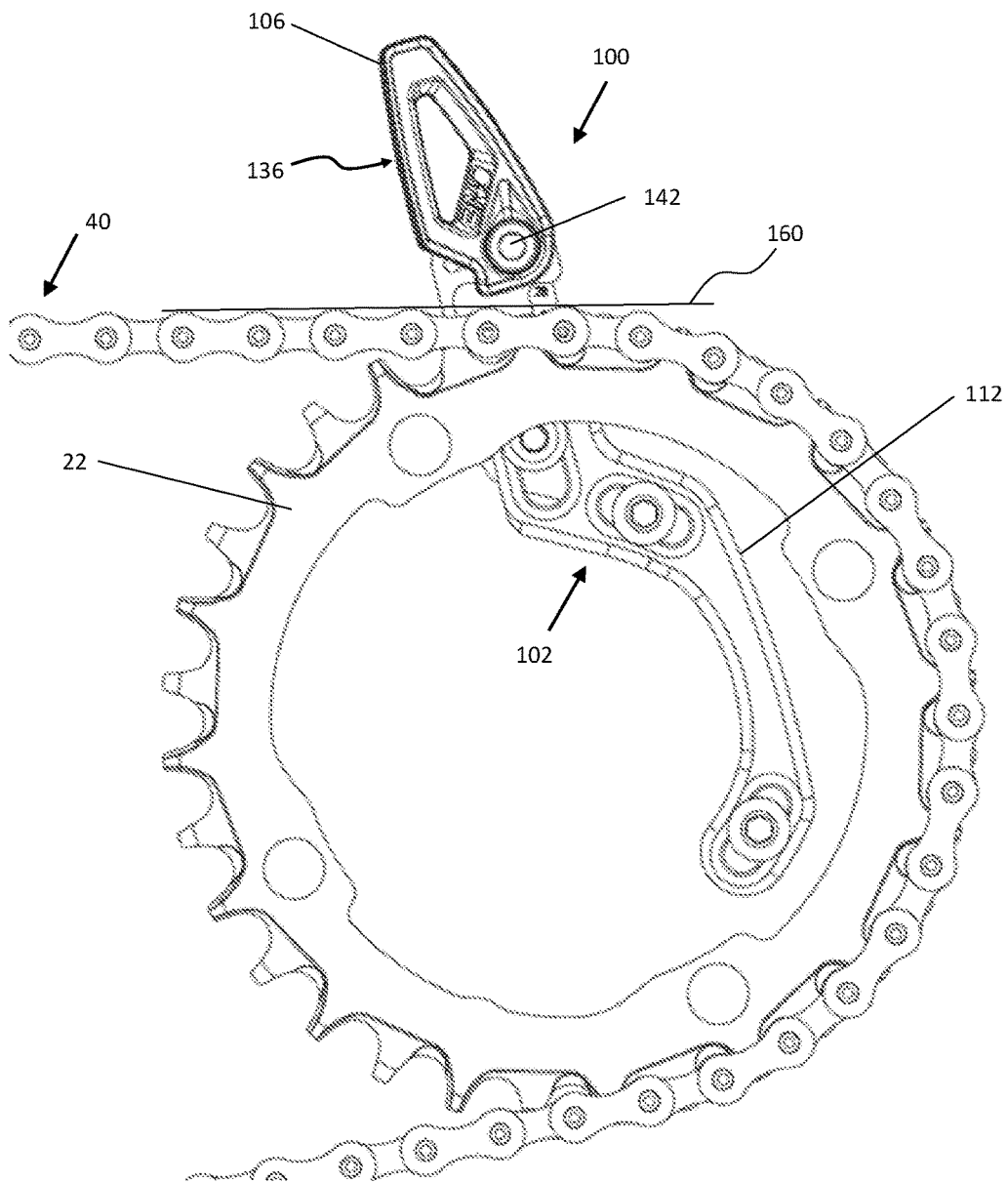
FIG. 10 is the side plan view of FIG. 11, with the retaining member in a removal position.

When a bicycle is ridden quickly over rough terrain, the length of chain 40 suspended between the top of the front chaining 22 and the top of the rear cassette 30, can become very active, moving up-and-down and moving side-to-side. This chain motion can cause the chain to derail the front chainring 22. For example, the chain may derail if the crankset is rotated or pedaled forwardly at a time when the chain 40 is not laterally aligned with the chainring 22, for example if the chain 40 is displaced upwardly or downwardly as illustrated in FIG. 10.

Chain guides have been developed to keep the chain engaged with the front chainring over rough terrain. Known chain guides can connect to the bicycle frame and may include a retaining member which may be positioned proximate the periphery of the front chainring 22. Due to the varying size of chainrings 22 in different bicycles and the desire to periodically reposition the retaining member for maintenance, it is desirable to make the retaining member of the chain guide movable/re-positionable.

As such, conventional chain guides have included a chain retaining member that can be raised and lowered (i.e. moved farther from and/or closer to the periphery of the chainring). Often a mechanism that provides for the height adjustment of the retaining member is slot or the like formed in the mounting plate to which the retaining member is attached. This may produce a chain guide that is bulky above the chain retaining member in some instances. For example, when the chain retaining member is adjusted to accommodate a chainring smaller than its highest capacity, there can be a portion of the base frame that extends above the chain retaining member. This portion of base frame that extends above the chain retaining member can interfere with the bicycle frame causing frame damage or incompatibility.

Generally, the chain retaining member chain guides also tend to inhibit access to the chain, front chainring and crankset. In some known chain guides the same mechanism controls both connection of the retaining member to the rest of the chain guide and the height adjustment of the retaining member. In such arrangements, installing, removing or perform maintenance on the chain, chainring or crankset typically also results in having to reset the height of the chain retaining member. As a result, conventional chain guides typically require that a height adjustment bolt be loosened to adjust the height of the retaining member in order to perform routine maintenance on the drivetrain.

In some known chain guides, the retaining member can be operated somewhat independently of its height adjustment. However, in some such designs, such as GRID ISCG Chainguide manufactured by Gravity Components of Mukileto, Wash., a single fastener is used to attach the retaining member to the rest of the chain guide, as well as lock the retaining member in at a given height. In such configurations, removing the retaining member requires removing the fastener, which also unlocks the height adjustment. When the retaining member is re-attached and the fastener re-installed, the retaining member height needs to be re-set. This configuration also requires that the locking member for controlling the height passes through the retaining member, and the rest of the chain guide, such as the mounting plates and the like, must extend to the upper most position that the retaining member is movable to, meaning that portions of the bracket are likely to be exposed when the retaining member is in a position other than its uppermost.

In other such designs, such as a BB Chainguide manufactured by Paul Component Engineering of Chico, Calif., a retaining member may be moved or detached from the rest of the chain guide while the height adjustment remains locked, but only when the chain guide is separated from the bicycle. In this configuration, the configuration of the chain guide is such that when it is mounted to the bicycle in a use position—i.e. when the retaining member is positioned sufficiently proximate the periphery of the chainring to inhibit chain derailment—the presence of the chain and chainring limit the movement of the retaining member without also adjusting its height. For example, in this design the retaining member cannot be moved into a chain removal position while at its use height because rotating the retaining member causes interference between portions of the retaining member and the chain. To allow the desired rotation, the retaining member can first be raised, to be clear of the chain, and then rotated. At that point, rotating the retaining member may be somewhat redundant, as merely raising the retaining member may be adequate to provide the desired access to the chain. Similarly, interference between the retaining member and the chain or chainring in this design prevents the retaining member from being laterally moved away from the rest of the chain guide, which inhibits removing the retaining member. The retaining member may be removed when spaced farther from the chainring by altering the height or when detached from the bicycle, but this does not allow a user to easily remove and re-attached the retaining member while the chain guide is in use (i.e. while mounted to the bicycle and possibly in a remote location) without also adjusting the height.

Accordingly, there may be a need for a chain guide in which the retaining member may be operated and/or removed, preferably while the chain guide is mounted to the bicycle, without modifying the height of the retaining member. The may be a need for a chain guide where a user can install, remove and/or move the retaining member or perform maintenance to the chain, chainring or crankset without having to release the height locking mechanism or otherwise adjust the height of the chain retaining member.

Accordingly, there may be a need for a chain guide that can be adjusted for a full range of front chainring sizes while eliminating the mounting plate portions that would typically extend above the chain retaining member in known designs.

There may also be a need for a chain guide in which the fastener and/or locking mechanism for setting the height of the retaining member need not extend through or otherwise engage the retaining member. This may allow the fastener and/or locking mechanism for setting the height to be placed in a less desirable and/or less accessible area (as it is generally accessed less frequently) that is spaced apart from where the retaining member is connected to the rest of the chain guide.

Referring to FIGS. 2-5, on example of a chain guide 100 that is usable with the bicycle drive train 10 includes a base frame 102, a height adjustment member 104 and a retaining member 106. The height adjustment member 104 is movable relative to the base frame 102 to adjust the height of the retaining member 106 relative to the chainring, such as chainring 22. Preferably, the height adjustment member 104 can be locked in a plurality of different positions relative to the base frame 102, using a suitable locking mechanism. The retaining member 106 is mounted to and is movable relative to the height adjustment member 104. Preferably, the retaining member 106 is movable between a retaining position and a removal position while the chain guide 100 is mounted to a bicycle.

When in the retaining position (see for example FIGS. 2 7 and 9), the retaining member 106 is positioned proximate the periphery of the chainring 22 and physically obstructs the lateral and/or vertical disengagement of the chain 40 from the chainring 22, while allowing the desired motion of the chain 40 around the chainring 22.

When in the removal position (see for example FIGS. 5 and 10) the retaining member 106 is moved relative to the height adjustment member 104 (for example pivoted, translated, detached and the like) to a position in which the retaining member 106 does not physically obstruct or otherwise interfere with removal of the chain 40 from the chainring 22 and/or in which a user may access the chain 40 and chainring 22 for inspection or maintenance. In the illustrated embodiment, while the chain guide is mounted to the bicycle the retaining member 106 can be moved relative to the height adjustment member 104, and can be detached from the height adjustment member 104, without moving the height adjustment member 104 relative to the base frame 102 and without disengaging the locking mechanism that secures the height adjustment member 104 to the base frame 102.

Figure 6:
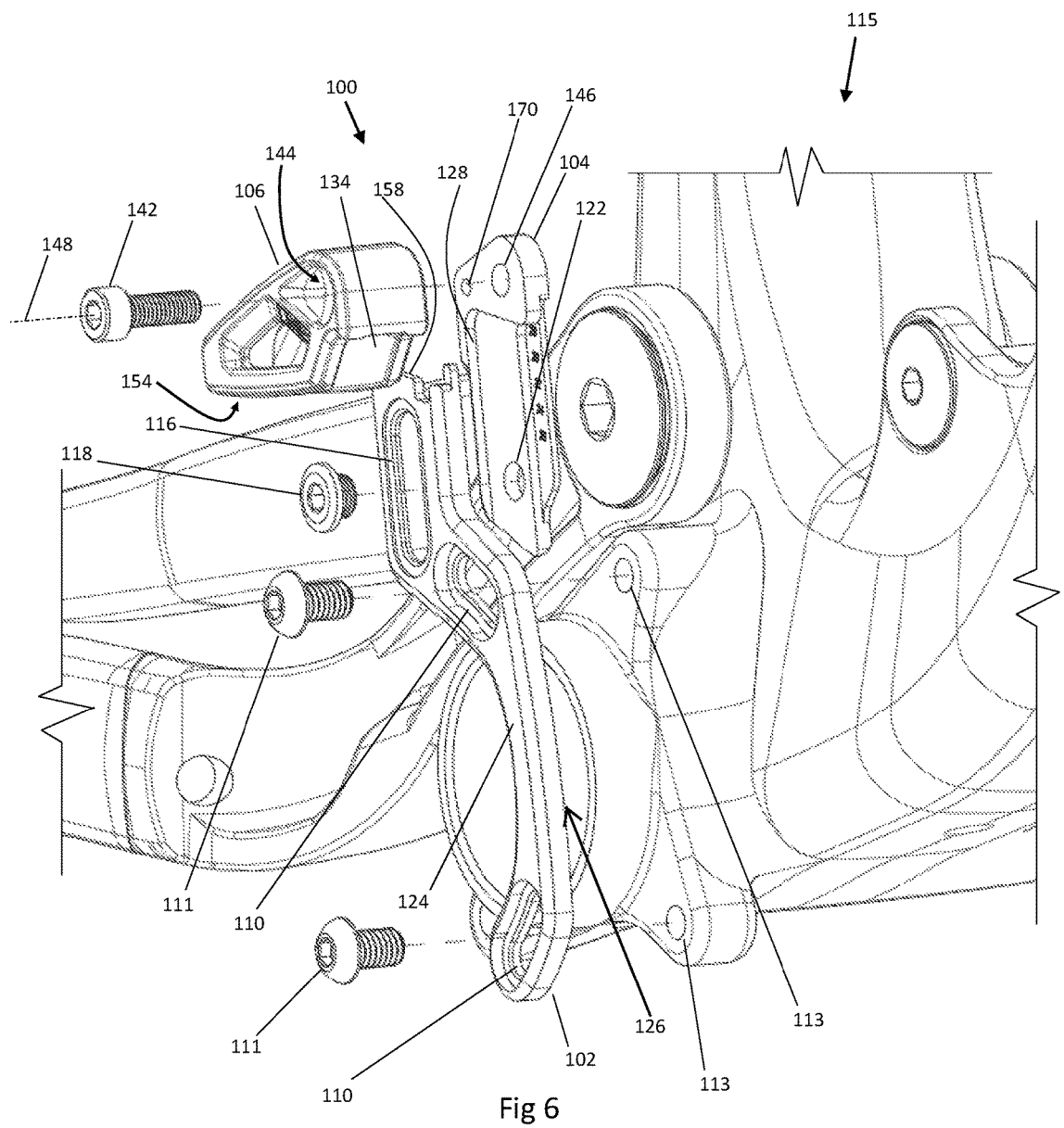
FIG. 6 an exploded perspective view of the chain guide of FIG. 2, illustrated adjacent a portion of a bicycle frame.

In the illustrated embodiment, the base frame 102 includes a mounting portion 112 that is configured to connect to a bicycle. The mounting portion may have a variety of different configurations to accommodate different bicycles and different industry mounting patterns, and in illustrated embodiment includes two apertures 110 that are spaced apart from each other and are configured to receive suitable base mounting fasteners, such as mounting bolts 111 which can be threaded into bosses 113 on the bicycle frame 115 (FIG. 6). In this example the apertures 110 are elongate slots, which may help facilitate mounting of the base frame 102 on a variety of bicycles and/or may allow for some fine-tuning of the base frame 102 position on a given bicycle. Alternatively, the apertures 110 may be round holes or any other suitable configuration.

The base frame 102 also includes an upper portion 114 that is spaced apart from the mounting portion 112 and is positioned so that when the base frame is mounted to the bicycle the upper portion 114 will be at a higher elevation than the mounting portion 112. In this example, the upper portion 114 is configured to be connected to and support the height adjustment member 104. The upper portion 114 may have any suitable configuration that allows for the desired connecting and re-positioning of the height adjustment member 104 relative to the base frame 102, and may include any desirable connecting portion. The connection portion may be configured to allow the height adjustment member 104 to be movably connected to the base frame 102, and may be configured to facilitate sliding, rotating, detachment and re-attachment at a variety of spaced attachment points and the like.

Figures 2, 3:
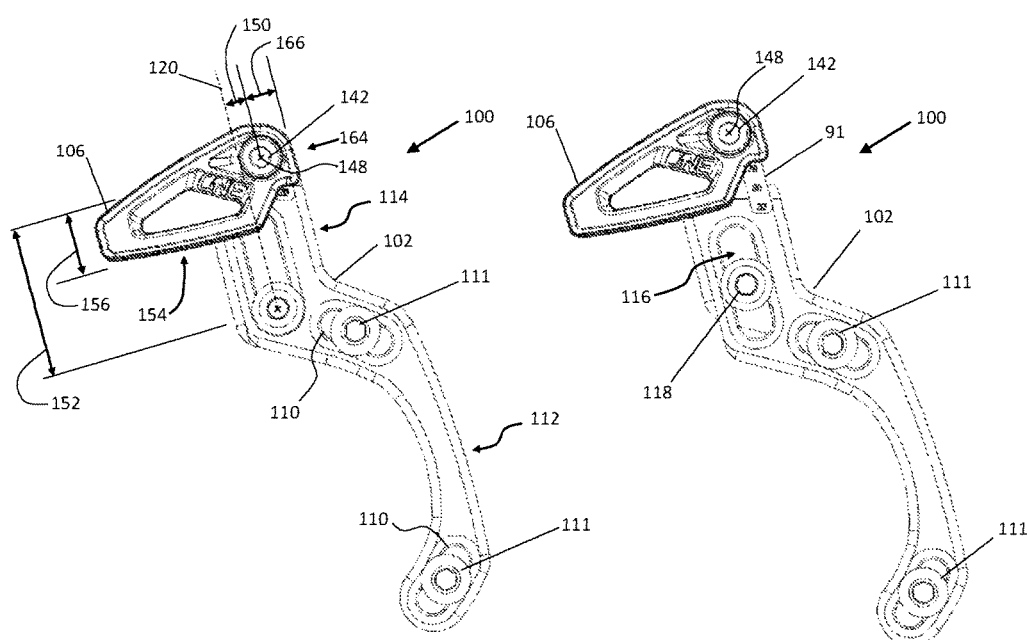
FIG. 2 is a side plane view of one example of a chain guide, with a height adjustment member in a first position and a retaining member in a retaining position.
FIG. 3 is a side plane view of the chain guide of FIG. 2, with a height adjustment member in a second position and a retaining member in the retaining position.
Figures 4, 5:
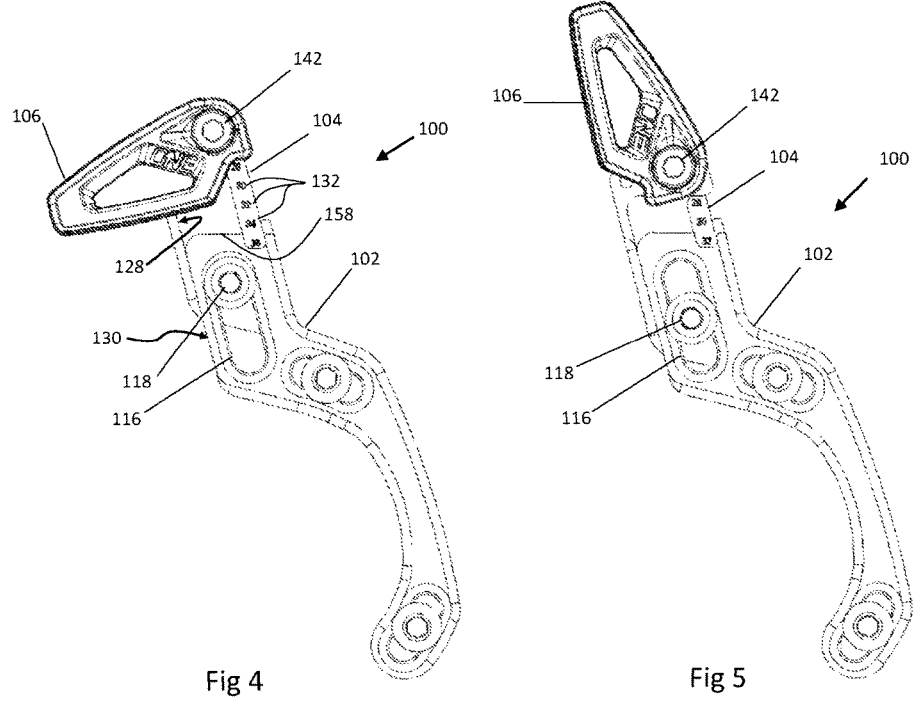
FIG. 4 is a side plane view of the chain guide of FIG. 2, with a height adjustment member in a third position and a retaining member in the retaining position.
FIG. 5 is a side plane view of the chain guide of FIG. 2, with a height adjustment member in the second position and the retaining member in a removal position.

Referring to FIGS. 2, 3 and 6, in the illustrated example, the upper portion 114 includes a track 116 that is configured to slidably receive a mounting fastener 118 that fastens the height adjustment member 104 to the base frame 102. The opening may be of any suitable shape, and defines a movement path along with the height adjustment member 104 travels. In this example, the track portion is a generally linear, elongate slot 116 that extends along a linear slot axis 120. The track portion 116 in this example is a through hole that extends completely through the base frame 102 in a lateral direction, but in other embodiments may be a closed bottom slot, channel, groove or the like. While shown as a linear slot, in some embodiments the slot 116 may be non-linear, and may be curved or otherwise configured.

In the illustrated example, the fastener 118 extends from the outer side 124 of the base frame 102, (i.e. the side that is outwardly facing when the base frame 102 is mounted to the bicycle) through the open slot 116 and threadingly engages a corresponding opening 122 (FIG. 6) on the height adjustment member 104 which is positioned on the opposing inner side 126 of the base frame 102.

Preferably, the chain guide 100 can include a locking member for locking the height adjustment member 104 in a fixed position relative to the base frame 102. In this example, the fastener 118 functions as both an attachment mechanism and a locking mechanism that can be selectably engaged and disengaged by a user. For example, tightening the fastener 118 will increase the friction between the base frame 102 and the height adjustment member 104 thereby locking the height adjustment member 104 in a given position. To unlock the height adjustment member 104, the locking mechanism can be disengaged by loosening fastener 118, but optionally not completely removing, the fastener 118. With the fastener 118 loosened but still extending through the slot 116, the height adjustment member can be moved along the length of the slot 116, and re-locked at any location therealong.

Alternatively, a separate locking member may be provided to lock the height adjustment member 104 in place. For example, a separate pin or the like may be insertable into corresponding apertures to fix the position of the height adjustment member 104, or a clamping mechanism may be used to grasp and hold the height adjustment member 104.

In the illustrated embodiment, the fastener 118 is separate from and spaced apart from the mounting bolts 111. In this configuration, the fastener 118 can be tightened and loosened without affecting the mounting bolts 111, and vice versa. This may allow the chain guide 100 to be attached to and removed from a bicycle without unlocking the fastener 118 or otherwise altering the height setting. This may also allow the height adjustment member 104 locking member (i.e. fastener 118 in this example) to be disengaged without affecting the connection between the base frame 102 and the bicycle.

In some embodiments, the height adjustment member 104 may be movable in two or more degrees of freedom relative to the base frame 102. For example the height adjustment member 104 may be translatable along the linear slot 116 and also rotatable, for example about the axis of the fastener 118. Alternatively, movement of the height adjustment member 104 may be constrained so that it is only movable in one degree of freedom, i.e. so that it is only translatable relative to the base frame 102. This may help ensure that the retaining member 106, which is movable with the height adjustment member 104, is only moved closer and farther from the periphery of the chainring 20, and isn't moved into unwanted positions. Optionally, the chain guide may include any suitable anti-rotation mechanism to help constrain the movement of the height adjustment member 104 in a desired manner.

In the illustrated example, the chain guide includes an anti-rotation mechanism that includes a sliding surface 128 on the height adjustment member 104 that is configured to slide against a complimentary abutment surface 130 (FIG. 4) on the base frame 102. The surfaces 128 and 130 are both generally planar and are slidable relative to each other, but engagement between the surfaces 128 and 130 restricts rotation of the height adjustment member 104 relative to the base frame 102.

Optionally, the chain guide 100 may include one or more indicia to help a user position the height adjustment member 104 in a desired position relative to the base frame 102. For example, either the base frame 102 or height adjustment member 104 may include markings identifying suitable positions for the height adjustment member 104 when the chain guide 100 is used in combination with different sized chainrings 22. In the illustrated example, the height adjustment member 104 includes indicia in the form of numbers 132 provided on the outer face of the height adjustment member 104. When the height adjustment member 104 is translated upwardly relative to the base frame 102 more numbers 132 may be revealed, and when the height adjustment member 104 is moved downwardly the numbers 132 are obscured. In this example, the numbers 132 relate to the number of teeth on the chainring 22, and user can move the height adjustment member 104 until the number 132 that corresponds to the number of teeth on his particular chainring 22 is the lowermost exposed number 132, and then tighten the fastener 118 to lock the height adjustment member 104 in place. Alternatively, other indicia may be used.

Figure 7:
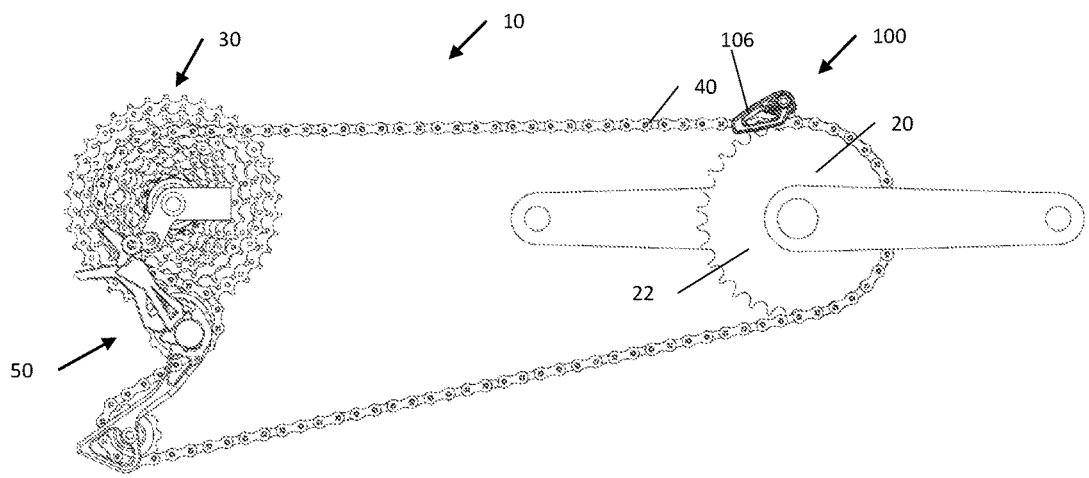
FIG. 7 is side plan view of the chain guide of FIG. 4 in use with the bicycle drive train of FIG. 1.
Figure 8:
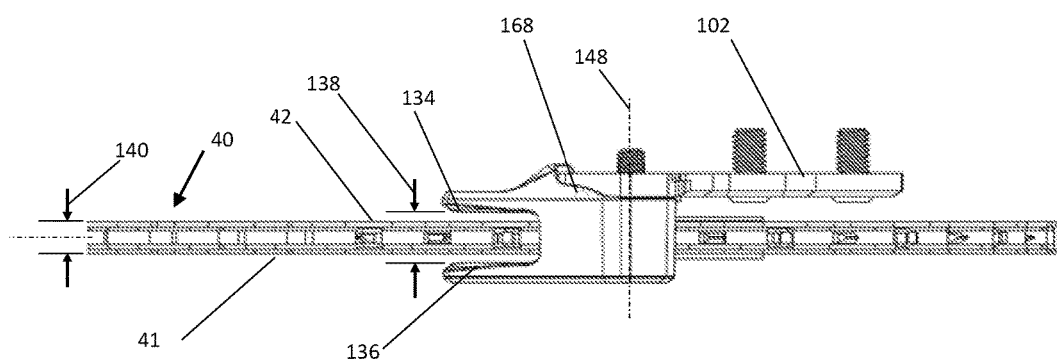
FIG. 8 is a top view of the chain guide of FIG. 4 positioned adjacent a chainring and chain.

The retaining member used with the chain guide 100 may have any suitable configuration. Referring to FIGS. 6 and 8, in the illustrated embodiment, the retaining member 106 includes a pair of laterally spaced apart inwardly facing chain retaining faces 134 and 136. In this example, the chain retaining face 134 is laterally spaced apart from the chain retaining face 136 by a lateral spacing 138 (FIG. 8) that is greater than the lateral thickness 140 of the chain 40. In this configuration, when the chain guide 100 is mounted to the bicycle and the retaining member is in the use position, as shown in FIG. 7 and in simplified FIGS. 8 and 9, the chain retaining faces 134 and 136 are positioned on opposite sides of the chain 40 and are laterally spaced apart from the side faces 41 and 42 of the chain 40 but are close enough to limit lateral movement of the chain 40. That is, if the chain 40 is deflected laterally its side faces 42 and 41 will come into contact with one of the chain retaining faces 134 and 136 before it has become sufficiently misaligned from the chainring 22 to cause a derailment. Contact with the chain retaining faces 134 and 136 will urge the chain 40 back to its laterally aligned position. This may help limit side-to-side misalignment of the chain 40.

When the chain guide 100 is in use, the retaining member 106 can be placed in its retaining position where it is in close proximity to the periphery of the chainring 22 and where the chain is laterally between the chain retaining faces 134 and 136. To provide access to the chain and/or to facilitate its removal from the chainring 22, the retaining member can be moved to its removable position in which at least one of, and optionally both of, the chain retaining faces 134 and 136 are moved away from the chain 40.

In the illustrated embodiment, the retaining member 106 is coupled to the upper end of the height adjustment portion using a mounting fastener 142 that extends through a corresponding aperture 144 in the retaining member 106 and threadingly engages a corresponding bore 146 in the upper end of the height adjustment member 104. In this arrangement, the mounting fastener 142 attaches the retaining member 106 to the height adjustment member 104 and also functions as a pivot joint, defining a pivot axis 148, about which the retaining member 106 can pivot. That is, the retaining member 106 can pivot about the mounting fastener 142, and its axis 148, between the retaining position of FIG. 9 and the removal position of FIG. 10.

The mounting fastener 142 may be oriented at any desirable angle and/or orientation, and in the illustrated embodiment is oriented so that the pivot axis 148 is generally parallel to the axis of rotation of the chainring 22, and is generally orthogonal to the linear slot axis 120. Because the mounting fastener 142 is separate from, and spaced apart from the fastener 118, it can be positioned in a location where the pivot axis 148 is offset from the slot axis 120 by an offset distance 150 (FIG. 2). This may help facilitate positioning the pivot axis 148 and fastener 142 in a desired location, without being constrained by the location or configuration of the slot 116 or fastener 118.

Optionally, when the head of the fastener 142 (i.e. the portion engaged by the tool of a user) is at least partially received within the retaining member 106 and remains exposed when the chain guide 100 is fully assembled. Preferably, the head of the fastener 142 is exposed on the same side of the chain guide as the head of the fastener 118, which may allow a user to access and manipulate both fasteners from the same side of the chain guide 100, and optionally while the chain guide 100 remains mounted to the bicycle.

Referring also to FIG. 2, in this example the pivot axis 148, and fastener 142, are also offset from the fastener 118 by height offset 152 (measured in the direction of the linear slot axis 120) and from a bottom surface 154 of the retaining member by a distance 156 that is substantially the full height of the retaining member 106 in the direction of the slot axis 120.

In the illustrated example, the chain guide 100 is configured so the retaining member 106 is connected to the height adjustment member 104 at a location that is spaced apart from, and position above location at which it is attached to base frame 102, via fastener 118. In this arrangement, the fastener 142, and pivot axis 148, is positioned above an upper end face 158 of the base frame 102 (i.e. the upper most portion of the base frame 102) when the height adjustment member 104 is in its highest position (FIG. 4), its lowest position (FIG. 2) and all positions in between. In this embodiment, retaining member 106 is generally flush with, or extends slightly beyond the upper end of the height adjustment member 104, and is positioned so that the retaining member 106 is the upper most portion of the chain guide 100, regardless of the position of the height adjustment member 104. That is, no portion of the slot 116 or other portions of the base frame 102 extend beyond the upper end of the retaining member 106 regardless of the position of the height adjustment member 104. This can reduce the likelihood of portions of the base frame 102 being exposed when the height adjustment member 104 is in a lowered position.

Figure 9:
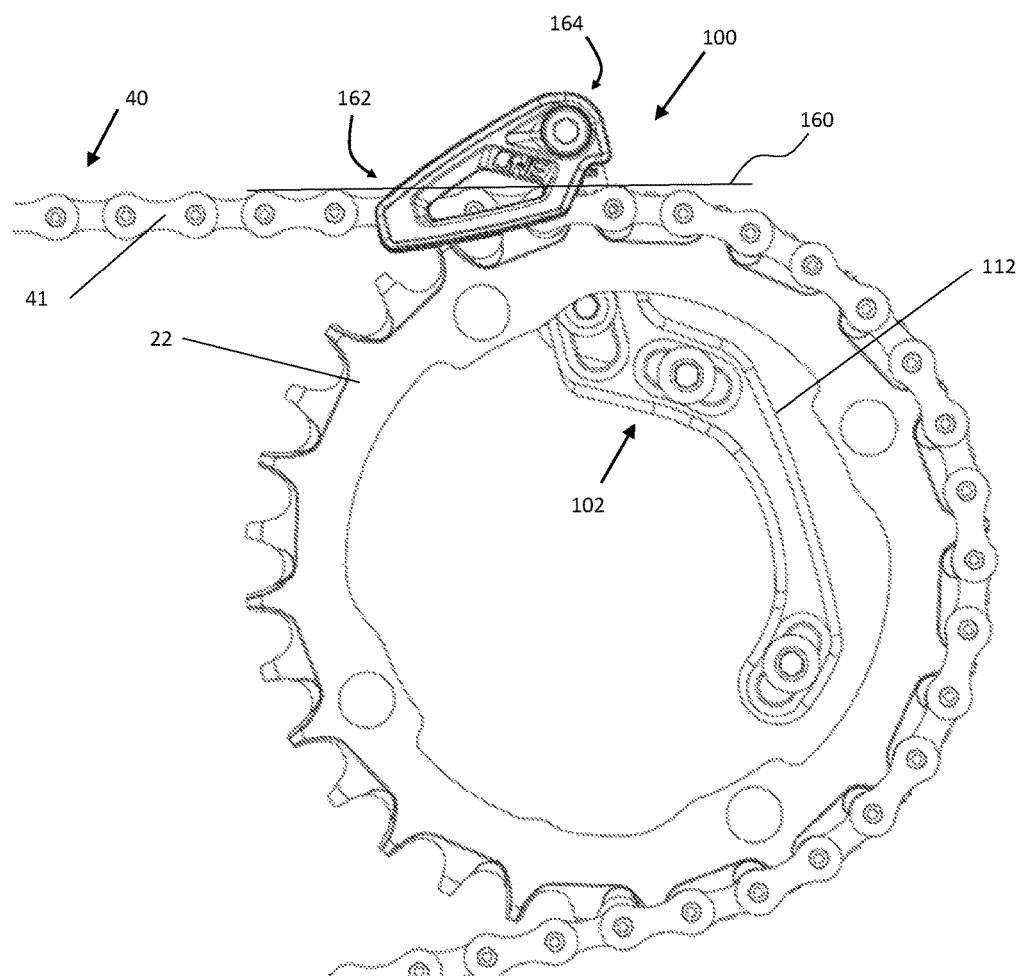
FIG. 9 is a side plan view of the arrangement of FIG. 10, with the retaining member in a retaining position.

Optionally, to help facilitate the desired rotation of the retaining member 106 and chain retaining face 136 while the retaining member 106 is closely spaced to the periphery of the chainring 22, the retaining member 106 can be configured so that it can pivot about the pivot axis 148 without portions of the retaining member 106 impacting or otherwise being obstructed by the chain or chainring. Referring to FIGS. 9 and 10, while the chain guide 100 is in use, the chain retaining faces 134 and 136 are intersected by a clearance plane 160 that represents the upper surface of the chain 40 and/or upper most extend of the teeth on the chainring 22. In this embodiment, the retaining member 106 has a first end 162 and a second end 164 that is spaced apart from the first end 162 in the direction of the chain 40. To help facilitate rotation of the retaining member 106, the fastener 142 and pivot axis 148 are disposed toward one end of the retaining member 106, the second end 164 in the illustrated example. Referring also to FIG. 2, in this position, the distance 156 between the pivot axis 148 and the bottom surface 154 is greater than the distance 166 between the pivot axis 148 and an end face at the second end 164 of the retaining member 106.

With the pivot axis 148 in this position, substantially all of the retaining member 106, and a majority of the chain retaining face 136, is disposed on one side of the pivot axis 148 (to the left as illustrated in FIG. 9) very little of the retaining member 106 overhangs to the other side of the pivot axis 148. When the retaining member 106 is pivoted about the axis 148 so that the chain retaining face 136 moves generally upwardly, away from the chain (i.e. clockwise as illustrated in FIG. 9) all of the retaining member 106 is positioned above the clearance plane 160. In contrast, if the pivot axis were located toward the middle of the retaining member (i.e. spaced between the first and second ends), pivoting the retaining member may cause portions on one side of the pivot axis to move upwardly away from the clearance plane, while causing portions on the other side of the pivot axis to move downwardly, into the clearance plane where they may interfere with access to or removal of the chain.

In the illustrated example, the retaining member 106 is of integrally formed, one piece construction and the chain retaining faces 134 and 136 move in unison with each other relative to the height adjustment member 104 and the rest of the chain guide. This may help simplify construction of the retaining member and/or may help reduce the number of components in the chain guide.

Alternatively, the chain retaining face 134 may be provided by the height adjustment member 104 or other portion of the chain guide 100, and need not be moveable in unison with the chain retaining face 136 provided on the movable retaining member 106. Optionally, if moving the chain retaining face 136 is sufficient to allow access to the chain and/or removal of the chain from the chainring, the chain retaining face 134 need not be movable at all, and remain in place when the retaining member is moved to its removal position. In such embodiments, moving the retaining member 106 its removal position includes moving the chain retaining face 136, but not the chain retaining face 134.

Optionally, the retaining member 106 may be locked in either its retaining position, its removal position, or both, using any suitable locking member or mechanism, and optionally may include two or more locking mechanism. In some configurations, the locking mechanism for securing the retaining member 106 may be the same as the fastener that is used to secure the retaining member 106 to the height adjustment member 104, such as fastener 142. Alternatively, the locking mechanism for the retaining member 106 may be separate from, and optionally spaced apart from, its fastener and/or from its pivot axis.

Referring to FIG. 6, in the illustrated embodiment the fastener 142 also functions as a locking member that can be used to lock the retaining member 106 in position. If the fastener 142 is sufficiently tightened, the friction between the retaining member 106 and the height adjustment member 104 may lock the retaining member 106 in place. Correspondingly, if the fastener 142 is loosened, rotation between the retaining member 106 and the height adjustment member 104 is permitted.

In the illustrated example, the chain guide 100 includes an alternate locking mechanism for the retaining member in the form of a projection or detent 168 (shown using hidden lines in FIG. 8) on the side of the retaining member 106 that engages with a corresponding recess 170 on the opposing surface of the height adjustment member 104. When the detent 168 is received within the recess 170 it may tend to inhibit rotation of the retaining member 106 under normal riding conditions. This may be used in place of the fastener 142 to lock the retaining member 106. To pivot the retaining member 106, a user may apply a sufficient torque to the retaining member 106 to overcome the interference and dislodge the detent 168 from the recess 170, thereby disengaging the locking mechanism. Preferably, the level of torque required is selected so that a user may rotate the retaining member 106 and overcome this locking mechanism by hand—without the need for tools.

Optionally, instead of a detent/recess mechanism, the locking mechanism may include a fastener that is separate from the mounting fastener 142 and that can inhibit rotation of the retaining member 106 when engaged. For example, such a locking fastener may extend through the retaining member 106 an engage the height adjustment member 104 or other suitable structure. The locking fastener may be a threaded fastener, or may be a non-threaded fastener such as a pin, clip, clamp and the like. For example, a non-threaded pin may be inserted through the retaining member 106 and into a corresponding hole in the height adjustment member 104. When the pin is inserted, rotation is inhibited and when the pin is removed, rotation is allowed. Similarly a threaded fastener may be inserted through the retaining member 106 and threaded into a complimentary boss on the height adjustment member 104. When the threaded fastener is in place rotation is inhibited, and when the threaded fastener is removed, rotation is allowed. Optionally, the locking fastener may be arranged to be generally parallel to the mounting fastener. In some configurations, the heads of both fasteners may remain exposed to a user when the chain guide is assembled, which may help facilitate access.

Optionally, the fastener 142 may be used as a locking member in combination with the detent/recess mechanism. In this configuration, the detent 168 may be inserted into the recess 170 to provide a first level of locking, and then the fastener 142 may be tightened to provide a second level of locking. To disengage the locks, the fastener 142 may first be loosened, and then the retaining member 106 pivoted to disengage the detent 168 from the recess 170. This may provide a back-up locking feature in the event that the fastener 142 could become inadvertently loosened when the bicycle is in use.

If the fastener 142 is removed entirely, the retaining member 106 may be detachable from the height adjustment member 104. As the fastener 142 is separate from the mechanism associated with the height settings, detaching and re-attaching the retaining member 106 may be done without loosening the fastener 118 and without affecting the height settings of the chain guide. If the retaining member 106 is in its removal position (FIG. 10) such that all of the retaining member 106 is above the clearance plane 160, the retaining member 106 may be laterally translated away from the height adjustment member 104 for removal while the chain guide 100 is attached to the bicycle—and without first raising the height adjustment member 104.

This description is meant to be illustrative and alternate mounting arrangements such as pins, rods or rivets instead of bolts or nuts instead of threaded holes may be used to connect the chain guide to a bicycle, or to attached the chain guide components to each other while still obtaining some or all of the advantages and features described herein. For example, the mounting style shown for the base frame 102 in the illustrated example is known as ISCG05 but various other standard mounting arrangements function in an analogous manner. Other frame mounting standards that may be used with the teachings described herein, for example as the mounting portion of the base frame 102, include but are not limited to High Direct Mount, Low Direct Mount, E-type, S1, S2, S3, ISCG, ISCG03, BB mount, Side Direct Mount.

While the above description provides examples of one or more apparatus, methods, or systems, it will be appreciated that other apparatus, methods, or systems may be within the scope of the claims as interpreted by one of skill in the art.

The invention claimed is:

1. A chain guide for a bicycle having a chainring and a chain, the chain guide comprising:
   a) a base frame having a mounting portion for connecting to a bicycle;
   b) a height adjustment member connected to the base frame and slidable relative to the base frame whereby the height adjustment member is movable relative to the base frame and is lockable in a first position by engaging a first locking member;
   c) a retaining member pivotally connected to the height adjustment member and being pivotable about a pivot axis that is spaced apart from the first locking member while the height adjustment member is locked in the first position, and wherein the retaining member is lockable in a retaining position by engaging a second locking member that extends through at least a portion of the retaining member, and wherein the second locking member is spaced apart from the first locking member and can be engaged and disengaged independent of whether the first locking member is engaged or disengaged;
   wherein when the base frame is connected to the bicycle with the height adjustment member locked in the first position and the retaining member positioned proximate a periphery of the chainring the retaining member is pivotable between the retaining position, in which the retaining member is positioned to obstruct lateral movement of the chain away from the chainring thereby preventing lateral misalignment between the chain and the chainring, and a removal position, in which the retaining member does not obstruct lateral movement of the chain away from the base frame.

2. The chain guide of claim 1, wherein the retaining member has a first end and a second end that comprises the pivot axis and is spaced from the first end in a direction that is parallel a direction of travel of the chain relative to the retaining member.

3. The chain guide of claim 2, wherein the first end is spaced apart from the height adjustment member and the second end is adjacent and overlies the height adjustment member.

4. The chain guide of claim 3, wherein the retaining member comprises a bottom face that is downward facing when the base frame is connected to the bicycle and the retaining member is in the retaining position, and an end face at the second end, and wherein a distance between the pivot axis and the bottom face in a first direction is greater than a distance between the pivot axis and the end face in a second direction that is orthogonal to the first direction.

5. The chain guide of claim 1, wherein the retaining member is connected to the height adjustment member by a mounting fastener that extends through the retaining member and is co-axial with the pivot axis whereby the retaining member pivots about the mounting fastener.

6. The chain guide of claim 5, wherein the second locking member comprises the mounting fastener, whereby the second locking member is disengaged by loosening the mounting fastener and engaged by tightening the mounting fastener and the retaining member pivots about second locking member.

7. The chain guide of claim 1, wherein the second locking member comprises a threaded fastener and the second locking member is disengaged by loosening the threaded fastener and engaged by tightening the threaded fastener.

8. The chain guide of claim 7, wherein the threaded fastener extends through the retaining member and threadingly engages the height adjustment member.

9. The chain guide of claim 1, wherein the first locking member comprises a first threaded fastener and is disengaged by loosening the first threaded fastener and engaged by tightening the first threaded fastener, and the second locking member comprises a second threaded fastener that is parallel to and offset from the first threaded fastener, and wherein the second locking member is disengaged by loosening the second threaded fastener and engaged by tightening the second threaded fastener.

10. The chain guide of claim 1, wherein when the base frame is connected to the bicycle, the height adjustment member is in the first position and the retaining member is positioned proximate the periphery of the chainring, the retaining member can be laterally translated away from the base frame in the direction of the pivot axis while in the removal position and is obstructed from translating away from the base frame by the chainring when in the retaining position.

11. The chain guide of claim 1, wherein when the base frame is connected to the bicycle with the height adjustment member locked in the first position and the retaining member is positioned proximate a periphery of the chainring and in the removal position the retaining member is translatable laterally away from the height adjustment member while the height adjustment member is locked in the first position to detach the retaining member from the height adjustment member.

12. The chain guide of claim 1, wherein the retaining member comprises a first chain retaining face and an opposing second chain retaining face that is laterally spaced apart from and faces the first chain retaining surface, whereby when the base frame is connected to the bicycle the chain is disposed laterally between the first and second chain retaining faces, and wherein the retaining member pivots in a first direction about the pivot axis from the retaining position to the removal position substantially the entire first and second chain retaining surfaces move in the first direction away from the chain.

13. The chain guide of claim 1, wherein retaining member comprises a first chain retaining face and an opposing second chain retaining face that is laterally spaced apart from and faces the first retaining surface, whereby when the base frame is connected to the bicycle and the retaining member is in the retaining position the chain is disposed laterally between the first and second chain retaining faces and a clearance plane defining an upper surface of the chain intersects the first and second chain retaining faces, and when the retaining member is in the removal position it is disposed entirely above the clearance plane.

14. The chain guide of claim 1, wherein the height adjustment member includes a sliding surface and the base frame includes a complimentary abutment surface such that engagement between the sliding surface and abutment surface prevents rotation of the height adjustment member relative to the base frame while permitting only linear translation therebetween.

15. The chain guide of claim 14, wherein the base frame is securable to the bicycle using at least one base fastener that is spaced apart from the first locking member, and wherein the first locking member can be engaged and disengaged independent of the at least one base fastener.

16. The chain guide of claim 1, wherein when the base frame is connected to the bicycle the retaining member forms the upper most part of the chain guide when the height adjustment member is in the first position and when the height adjustment member is moved to a different, second position relative to the base frame.

17. A chain guide for a bicycle having a chainring and a chain, the chain guide comprising:
a) a base frame having a mounting portion for connecting to a bicycle;
b) a height adjustment member connected to the base frame and slidable relative to the base frame whereby the height adjustment member is movable relative to the base frame and is lockable in a first position by engaging a first locking member;
c) a retaining member pivotally connected to the height adjustment member and spaced apart from the first locking member, the retaining member being pivotable about a pivot axis while the height adjustment member is locked in the first position and comprises a first chain retaining face and an opposing second chain retaining face that is laterally spaced apart from and faces the first retaining surface a first chain retaining face;
wherein when the base frame is connected to the bicycle with the height adjustment member locked in the first position and the retaining member positioned proximate a periphery of the chainring the retaining member is pivotable between a retaining position, in which the chain is disposed laterally between the first and second chain retaining faces whereby engagement between the chain and the first and second chain retaining faces obstructs lateral movement of the chain away from the chainring, and a removal position, in which the first and second chain retaining faces are spaced above the chain and the retaining member does not obstruct lateral movement of the chain away from the base frame, and
wherein the retaining member is lockable in the retaining position by engaging a second locking member that extends through at least a portion of the retaining member, and wherein the second locking member is spaced apart from the first locking member and can be engaged and disengaged independent of whether the first locking member is engaged or disengaged.

18. The chain guide of claim 17, wherein the wherein the retaining member is connected to the height adjustment member by a mounting fastener that extends through the retaining member and engages the height adjustment member and is co-axial with the pivot axis whereby the retaining member pivots about the mounting fastener, and wherein the mounting fastener is spaced apart from the first and second chain retaining faces.

19. The chain guide of claim 17, wherein the first locking member comprises a first threaded fastener which extends through a slot in the base frame and is disengaged by loosening the first threaded fastener and engaged by tightening the first threaded fastener, and the second locking member comprises a second threaded fastener that is parallel to and offset from the first threaded fastener, and wherein the second locking member is disengaged by loosening the second threaded fastener and engaged by tightening the second threaded fastener.

20. The chain guide of claim 17, wherein when the retaining member is in the retaining position a clearance plane defined by an upper surface of the chain intersects the first and second chain retaining faces, and wherein the retaining member is pivotable without disengaging the first locking member into the removal position in which the entirety of the retaining member is disposed entirely above the clearance plane.

* * * * *